(12) United States Patent
Barlow

(10) Patent No.: US 8,468,182 B1
(45) Date of Patent: Jun. 18, 2013

(54) DEVICE FOR DETERMINING A CHRONOLOGICAL AGE OF A PERSON AND METHOD OF USE THEREOF

(76) Inventor: Lucy Barlow, Kingsland, GA (US)

( * ) Notice: Subject to any disclaimer, the term of this patent is extended or adjusted under 35 U.S.C. 154(b) by 1012 days.

(21) Appl. No.: 12/460,011

(22) Filed: Jul. 10, 2009

Related U.S. Application Data

(60) Provisional application No. 61/134,439, filed on Jul. 10, 2008.

(51) Int. Cl.
*G06F 13/00* (2006.01)
*G06F 7/00* (2006.01)

(52) U.S. Cl.
USPC .............................. 708/160; 708/146; 708/200

(58) Field of Classification Search
None
See application file for complete search history.

(56) References Cited

U.S. PATENT DOCUMENTS

| | | |
|---|---|---|
| 4,005,571 A | 2/1977 | Wolff |
| 4,153,874 A | 5/1979 | Kaestner |
| 4,625,175 A | 11/1986 | Smith |
| 4,754,418 A | 6/1988 | Hara |
| 5,031,161 A | 7/1991 | Kendrick |
| 5,327,403 A | 7/1994 | Bond |
| 5,496,070 A | 3/1996 | Thompson |
| 5,626,133 A | 5/1997 | Johnson et al. |
| 5,777,905 A | 7/1998 | Dowdle et al. |
| 6,679,425 B1 | 1/2004 | Sheppard et al. |
| 6,959,861 B1 | 11/2005 | Walters |
| 2007/0233523 A1* | 10/2007 | Izumi .............................. 705/3 |

* cited by examiner

*Primary Examiner* — Scott Sun
(74) *Attorney, Agent, or Firm* — Montgomery Patent & Design; Robert C. Montgomery

(57) ABSTRACT

A specialty calculator for determining the chronological age of an individual based upon a birth date and a current date is herein disclosed. The device is also capable of performing standard arithmetic calculations such as addition, subtraction, multiplication and division. The device comprises dedicated circuitry, programming, and keys designed to determine the age of an individual based upon their birth date. A battery-maintained present date is stored in memory or may be entered manually to determine the chronological age of the user. The resultant output is provided in the form of years, months, and days on a digital display. The calculating device saves the time required to perform a difficult manual calculation and insures a user a reliable calculation.

8 Claims, 4 Drawing Sheets

DEVICE FOR DETERMINING A CHRONOLOGICAL AGE OF A PERSON AND METHOD OF USE THEREOF

RELATED APPLICATIONS

The present invention was first described in and claims the benefit of U.S. Provisional Application No. 61/134,439, filed Jul. 10, 2008, the entire disclosures of which are incorporated herein by reference.

FIELD OF THE INVENTION

The present invention relates generally to devices for calculating a differential in time, and more particularly, to a device for determining the chronological age of a person and method of calculation thereof.

BACKGROUND OF THE INVENTION

In the course of many professional and educational assessments, the evaluation of a patient or subject involves utilizing standardized testing instruments. These instruments commonly measure a subject's performance against that of a standardized norm, such as the average of the general population within a specified criterion such as age. Many of these standardized measuring instruments utilize defined reference tables and analyze performance within six (6) month age intervals. Thus in certain assessments, educational and medical professionals are required to calculate a person's age. This calculation is necessary for determining how a subject is performing relative to others within the same chronological age range. These calculations typically involve calculating the number of years, months, and days past a birthday, particularly where the professional is involved with assessing a young subject. The calculations are traditionally done by hand or with the use of a conventional calculator by the professional during the assessment process. Although these calculations are rarely complicated due to the nature of mathematical problem solving and the tendency for distractions during assessments, errors can occur in the calculation. Unfortunately this can lead to inaccuracies in calculations and consume the professional's valuable time.

Various devices exist to assist a user in performing certain desired calculations, such as elapsed time from two (2) specified dates, the predicted life of an item, obstetrical events, and the like. These attempts can be seen by reference to various U.S. patents, including U.S. Pat. Nos. 4,005,571, issued in the name of Wolff, which describes an elapsed time reminder with conversion of calendar days into elapsed time; 4,153,874, issued in the name of Kaestner, which describes a mobile perpetually self-correcting estimated time of arrival calculator; 5,626,133, issued in the name of Johnson et al., which describes a gestational computer; 4,625,175, issued in the name of Smith, which describes a device indicating the time remaining of the useful life of a battery; and 5,777,905, issued in the name of Dowdle et al., which describes an obstetrical and gynecological event and status calculator.

Other devices attempt to utilize the birth date of an individual for age verification in order to authorize access to age restricted good and services, such as tobacco, alcohol, or electronic media. These devices utilize electronic age verification methods such as reading the magnetic strip on the back side of a driver's license or utilizing an electronic statement verifying the birth date of a user. Examples of these devices can be seen by reference in the following U.S. Pat. No. 6,679,425, issued in the name of Sheppard et al., describes systems, apparatus and processes to verify a person's age to determine if the person is authorized and U.S. Pat. No. 6,959,861, issued in the name of Walters, describes a method of age verification for electronic media.

While these devices fulfill their respective, particular objectives, each of these references suffers from one (1) or more of the aforementioned disadvantages and fails to solve the aforementioned problems. Accordingly, there exists a need for a means by which age calculations can be simply and accurately made without the disadvantages as described above. The development of the present invention substantially departs from the conventional solutions and in doing so fulfills this need.

SUMMARY OF THE INVENTION

In view of the foregoing references, the inventor recognized the aforementioned inherent problems and observed that there is a need for a means to accurately calculate the age of person in a manner that is reliable and saves time and frustration and thus, the object of the present invention is to solve the aforementioned disadvantages and provide for this need.

To achieve the above objectives, it is an object of the present invention to provide a device for determining a chronological age of a person and method of use thereof that provides a convenient and portable means to reliably and accurately calculate the age of subject to the nearest day, month and year.

Another object of the device for determining a chronological age of a person and method of use thereof is to provide a device comprising a specialty battery-powered calculating mechanism for determining the chronological age of an individual based upon the entry of a birth date and a present date. The present date is maintained via an internal clock or alternatively may be manually entered by a user. The calculated chronological age is provided in the form of years, months, and days and is displayed on a digital display. The device instantly provides for accurate calculation of an age in contrast to the time required and possible inaccuracy of a manual calculation.

Yet still another object of the device for determining a chronological age of a person and method of use thereof is to provide a device that performs standard mathematic calculations such as addition, subtraction, multiplication or division.

Yet still another object of the device for determining a chronological age of a person and method of use thereof is to provide a device comprising an enclosure, a digital display, a plurality of mode buttons, three (3) time period buttons, an "ON" button, a plurality of numeric buttons, and a plurality of math function buttons. The device provides rapid execution of age calculations and other various mathematical functions by interfacing with the buttons and internal software.

Yet still another object of the device for determining a chronological age of a person and method of use thereof is to provide a device comprising an age calculator having an alternate embodiment comprising a reduced calculation capability. The alternate age calculator embodiment exclusively provides a means of age calculation. The alternate age calculator embodiment comprises an alternate enclosure which reduces the size of the device and the number of data entry buttons.

Yet still another object of the device for determining a chronological age of a person and method of use thereof present invention is to provide a method of utilizing the device that provides for increased ease of calculating an individual's age in a manner which is simple, easy, effective, and that provides for increased accuracy.

Further objects and advantages of the device for determining a chronological age of a person and method of use thereof will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

| | |
|---|---|
| 10 | device for determining a chronological age of a person |
| 20 | first housing |
| 25 | digital display |
| 30 | first mode button |
| 31 | second mode button |
| 35 | month input button |
| 36 | day input button |
| 37 | year input button |
| 40 | "ON" button |
| 45 | numeric button |
| 50 | function button |
| 60 | battery |
| 62 | battery compartment |
| 65 | data processing module |
| 67 | clock |
| 80 | alternate age calculator embodiment |
| 81 | "ENTER" button |
| 85 | second housing |
| 100 | user |

DETAILED DESCRIPTION OF THE PREFERRED EMBODIMENT

Figure 1:
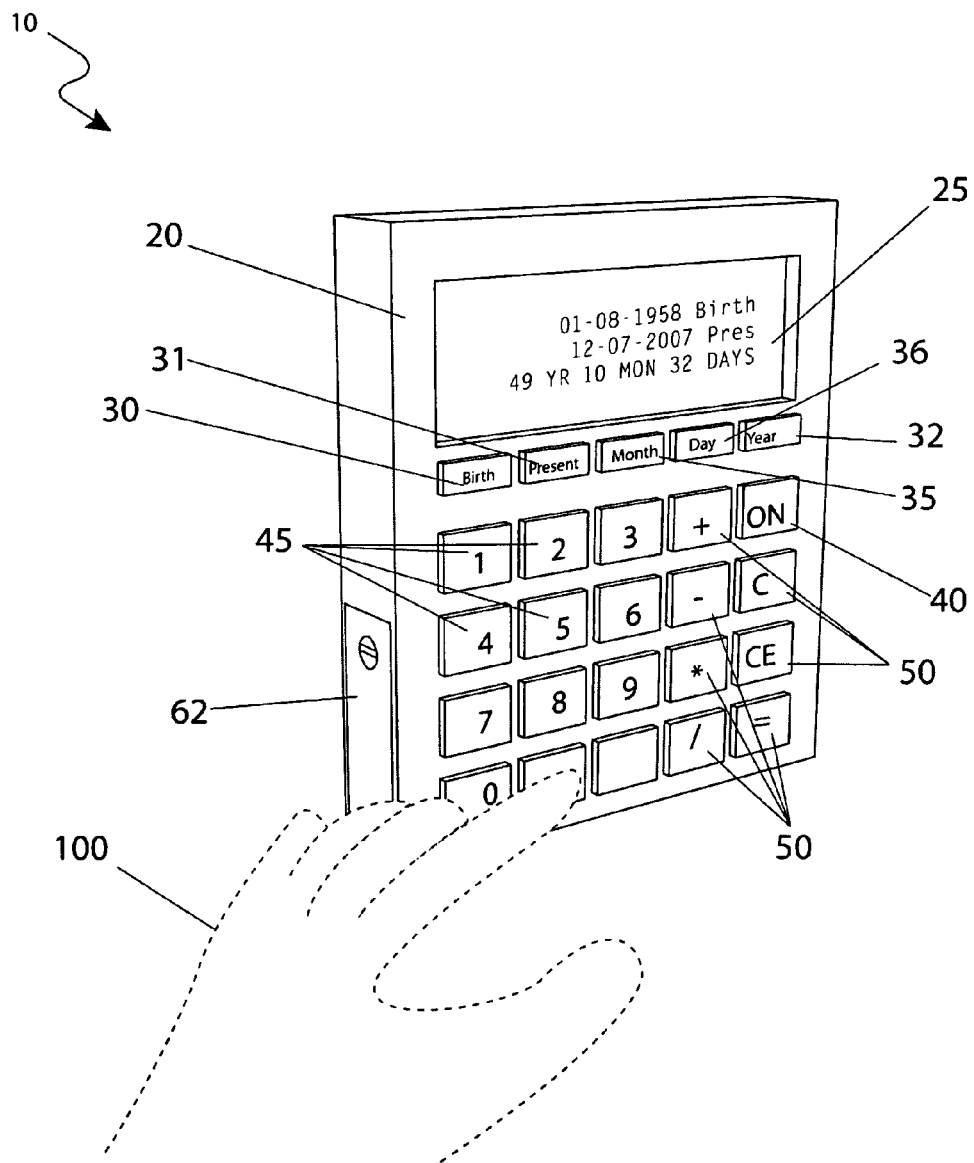
FIG. 1 is a front view of a device for determining a chronological age of a person and method thereof 10, according to a preferred embodiment of the present invention.
Figure 2:
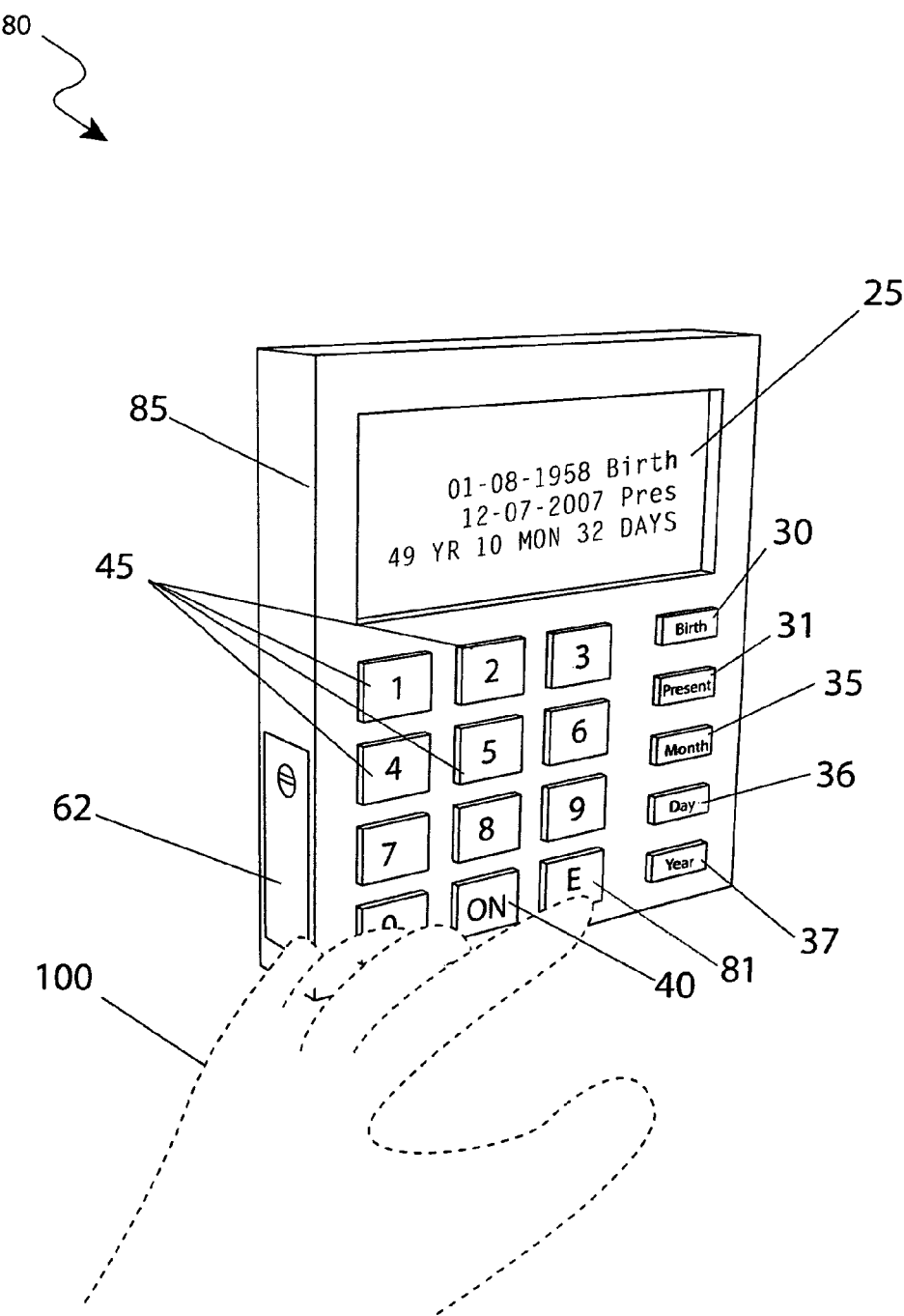
FIG. 2 is a front view of an alternate age calculator embodiment 80 of the present invention.
Figure 3:
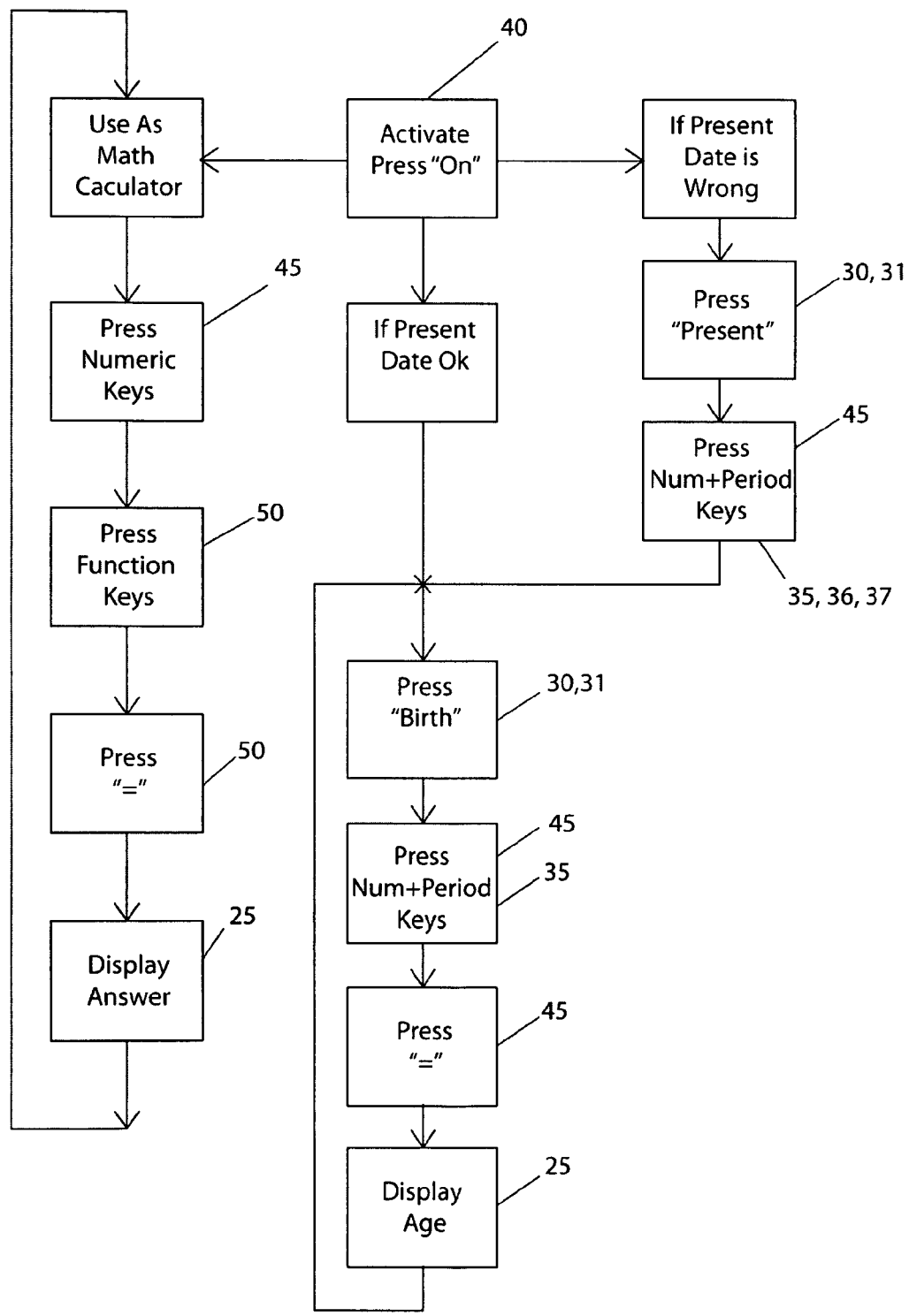
FIG. 3 is a sequence of operation diagram for determining a chronological age of a person, according to a preferred embodiment of the present invention; and, FIG. 4 is an electrical block diagram of the device for determining a chronological age of a person and method thereof 10, according to a preferred embodiment of the present invention.
Figure 4:
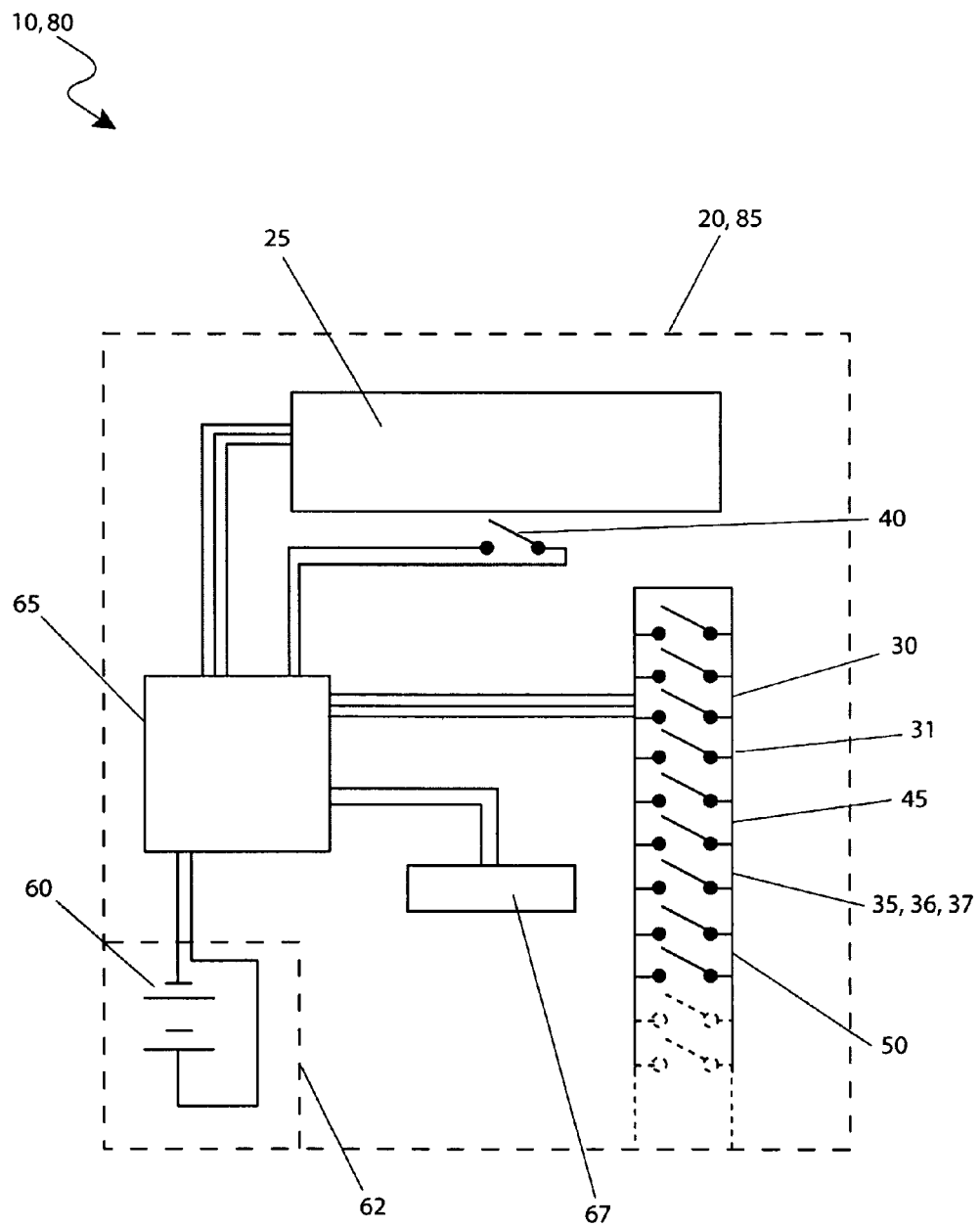

The best mode for carrying out the invention is presented in terms of its preferred embodiment, herein depicted within FIGS. 1, 3 and 4 and in terms of its alternate embodiment, herein depicted in FIG. 2. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a device and a method for determining a chronological age of a person (herein described as the "device" and "method") 10, comprising a specialty battery-powered calculator for determining the chronological age of an individual 100 based upon entry of their birth date and a present date. The present date is maintained via an internal clock 67 or may also be manually entered by the user 100. The calculated chronological age is provided in the form of years, months, and days and displayed on a digital display 25. The device 10 provides instantly execution of an age calculation in contrast thereto a length of time required to performing said calculation manually. Additionally the device 10 is capable of performing standard mathematic calculations such as addition, subtraction, multiplication and division in a similar manner as a conventional calculator.

Referring now to FIG. 1, a front view of the device 10, according to the preferred embodiment of the present invention, is disclosed. The device 10 comprises a first housing 20, a digital display 25, a plurality of mode buttons 30, three (3) time period buttons 35, an "ON" button 40, a plurality of numeric buttons 45, and a plurality of math function buttons 50. The device 10 is to be capable of quickly executing the age calculation and the various mathematical functions by utilizing the buttons 30, 35, 40, 45, 50, and internal software.

The first housing 20 provides a protective housing thereto internal electrical and electronic components such as, but not limited to: microprocessors, embedded software, circuit boards, electronic components, memory chips, one (1) or more batteries 60, a battery compartment 62, and the like. Additionally, the first housing 20 provides a mounting means thereto externally accessed portions of the device 10 including a multi-line digital display 25 and a plurality of numeric buttons 45 in a similar manner as a mathematical calculator. The device 10 also comprises additional data entry buttons including mode buttons 30, time period buttons 35, an "ON" button 40, and mathematical function buttons 50, thereby providing a sequential data entry and calculating means (see FIG. 3). The enclosure 20 comprises a rugged attractive plastic housing being of a generally rectangular shape having a front panel being approximately four (4) inches by three (3) inches and one-half (½) thick. The first housing 20 further provides a storage means thereto one (1) or more batteries 60 therewithin a flush-mounted battery compartment 62 integrated thereinto a side or rear surface of said first housing 20. Said first housing 20 is also envisioned being introduced in a variety of aesthetic colors and patterns based upon a user's 100 preference.

The device 10 is illustrated here depicting a plurality of numeric data entry buttons arranged here for illustration sake; however, it is understood that additional buttons, additional button types, and additional arrangements of said buttons may be provided based upon various functions, desired appearances, and particular software capabilities without deviating from the concept and as such should not be interpreted as a limiting factor of the invention 10. Said data entry buttons 30, 35, 40, 45, 50 are envisioned to comprise common spring-return biased switches or buttons which utilize equivalent or current technologies. The mode buttons 30 provide a switching means therebetween entry of different data types such as, but not limited to: a birth date, a present date, and numeric data. It is understood that additional mode buttons 30 may be provided based upon particular software capabilities of the device 10 and as such should not be interpreted as a limiting factor of the device 10. The device 10 is powered using internal user replaceable batteries 60, thereby supplying electrical power in an uninterrupted manner thereto memory chips, microprocessor-based circuits, and the clock 67 (see FIG. 4). The device 10 further comprises an "ON" button 40 providing a power switching means thereto the digital display 25 and the data entry buttons 30, 45, 50 in a normal manner. It is further envisioned that said operational power would be turned off automatically via a software timer circuit during an extended idle period to conserve battery life 60; however, it is further understood that the device 10 may be configured to comprise a manually activated "OFF" button and corresponding circuit, and as such should not be interpreted as a limiting factor of the invention 10.

The digital display 25 comprises a large liquid crystal display (LCD), light emitting diode (LED), or equivalent current display technology component, being capable of displaying three (3) or more horizontal lines of alphanumeric characters, thereby providing a clear display of pertinent information such as, but not limited to: a birth date, a present date, a calculated age, a mathematic calculation sequence, and the like.

Referring now to FIG. 2, a front view of an alternate age calculator embodiment 80 of the present invention, is disclosed. The alternate age calculator embodiment 80 comprises reduced calculation capabilities when compared thereto the preferred embodiment 10. The alternate age calculator embodiment 80 exclusively provides an age calculation means while excluding the previously described mathematic functions of the preferred embodiment 10. The alternate age calculator embodiment 80 comprises a second enclosure 85 which is envisioned to comprise reduced height and width dimensions resulting therefrom an anticipated reduced number of data entry buttons 50 along a front surface thereof and further comprising an "ENTER" button 81. However, the alternate age calculator embodiment 80 is envisioned to comprise similar age calculation software, hardware, and display capabilities 25 as the preferred embodiment 10.

Referring now to FIG. 3, a sequence of operation diagram for determining a chronological age of a person, indicating a logic flow as a proper method of utilizing the device 10, is disclosed.

Referring now to FIG. 4, an electrical block diagram of the device for determining chronological age of a person and method thereof 10, according to a preferred embodiment of the present invention, is disclosed. The device 10 receives direct current (DC) power therefrom one (1) or more rechargeable or disposable user replaceable batteries 60 stored therewithin a battery compartment 62. Said DC power is supplied in an uninterrupted manner thereto the data processing module 65 which comprises electronic and electrical components necessary for operation of the device 10 such as memory chips, microprocessor circuits, relays, a clock 67, and embedded software. Said data processing module 65 is in electronic communication therewith the digital display 25, the "ON" button 40, the data entry buttons 30, 45, 50, and the internal clock 67. Data signals are received therefrom said data entry buttons 30, 45, 50, thereby enabling software therewithin the data processing module 65 to calculate the chronological age of the user 100 which is in-turn displayed thereupon the digital display 25.

The data processing module 65 contains age calculation software algorithms which are envisioned to compute a chronological age by subtracting a user's birth date therefrom a present date. The age calculation is accomplished by utilizing a mathematical method such as, but not limited to: a day/serial number system residing in memory within said data processing module 65 wherein each date is assigned a unique serial number. For example Sep. 27, 1999 has a serial number of 36430 based upon a 1900 date system in which Jan. 1, 1900 is date serial 1, Jan. 2, 1900 is date serial 2, and so on.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the device 10, it would be operated thereby a user 100 as seen in FIG. 1, and to sequentially execute a plurality of operational steps as illustrated in FIG. 3.

The specific steps required to utilize the device 10 are as follows: loading one (1) or more fresh batteries 60 thereinto the battery compartment portion 62 of the first housing 20; pressing the "ON" button 40, thereby activating the display 25 and button portions 30, 45, 50 of the device 10; observing and verifying accuracy of the displayed current date as automatically presented on the digital display 25; pressing a "PRESENT" (present date) mode button 30 to change present date data, if needed; pressing subsequent numeric buttons 45 and time period buttons 35 to enter a corrected present date; pressing the "=" (equal) function button 50 to enter the updated present date into memory; pressing the "BIRTH" (birth date) mode button 30; entering birth date data using the numeric buttons 45 and time period buttons 35; pressing the "=" function button 50 to enter the birth date into memory; observing a calculated age of a user 100 which is automatically displayed upon the digital display 25 and expressed in terms of years, months, and days; performing additional age calculations by entering additional birth dates, as desired; alternately using the device 10 as a common calculator to perform normal mathematical functions such as adding, subtracting, multiplication, and division using the numeric buttons 45 and the math function buttons 50 in a normal manner; turning off the device 10 by allowing said device 10 to time out by sitting idle for a period of time; and, benefiting from fast and accurate chronological age calculations afforded the user 100 of the invention 10.

The method of utilizing the alternate age calculation embodiment 80 may be achieved by performing the age calculation functions as described above; however, utilizing the "ENTER" button 81 instead of the "=" function button 50 of the preferred embodiment. The alternate age calculation embodiment 80 comprises no mathematical function buttons 50, and is therefore not capable of performing normal math functions.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. An age calculator for determining a chronological age, comprising:
 an enclosure, comprising a microprocessor, a memory device, a digital display, and an internal clock;
 a plurality of mode buttons, thereby providing a mode data entry;
 a plurality of time period buttons for providing a time period date entry, said time period buttons including a month button, a day button, and a year button;
 a plurality of numeric buttons for providing numeric data entry;
 a power button providing a selectable power supply to said age calculator from a power source; and,
 a data processing module in electronic communication therewith said microprocessor, said memory device, said digital display, said internal clock, said plurality of mode buttons, said plurality of time period buttons, said plurality of numeric buttons, and said power button;
 wherein said age calculator determines and displays said chronological age in day, month, and year format.

2. The age calculator of claim 1, wherein said enclosure provides a protective resilient housing thereto internal electrical and electronic components.

3. The age calculator of claim 1, wherein said power source further comprises at least one removable battery.

4. The age calculator of claim 1, wherein said plurality of mode buttons further comprise a switching means therebetween entry of different data types comprising a birth date, a present date, and numeric data;
 wherein a mode indicia is displayed thereon said digital display.

5. The age calculator of claim 1, wherein said data processing module receives and processes said mode data entry of said subject and said time period data entry of said subject and calculates said chronological age thereof said subject based on a mathematical algorithm and displays said chronological age thereon said digital display.

6. The age calculator of claim 5, wherein said algorithm comprises a day/serial number system residing in said memory device wherein each date is assigned a unique serial number.

7. The age calculator of claim 1, wherein said age calculator functions as a calculator, further comprising a plurality of math function buttons, thereby providing a math function data entry in electronic communication therewith said data processing module.

8. The age calculator of claim 7, wherein said enclosure comprises a plastic housing being of a generally rectangular shape having a front panel being approximately four (4) inches by three (3) inches and one-half (½) thick.

* * * * *